(12) United States Patent
Nishimoto et al.

(10) Patent No.: US 7,752,362 B2
(45) Date of Patent: Jul. 6, 2010

(54) STORAGE SYSTEM PROVIDING STREAM-ORIENTED PERFORMANCE ASSURANCE

(75) Inventors: Akira Nishimoto, Sagamihara (JP); Naoto Matsunami, Hayama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/207,091

(22) Filed: Sep. 9, 2008

(65) Prior Publication Data
US 2009/0013104 A1   Jan. 8, 2009

Related U.S. Application Data

(63) Continuation of application No. 11/144,796, filed on Jun. 6, 2005, now abandoned.

(30) Foreign Application Priority Data

Apr. 4, 2005   (JP)   ............... 2005-107013

(51) Int. Cl.
*G06F 3/00* (2006.01)
*G06F 5/00* (2006.01)
*G06F 13/12* (2006.01)

(52) U.S. Cl. ............... 710/74; 710/5; 710/58
(58) Field of Classification Search .......... 710/74
See application file for complete search history.

(56) References Cited

U.S. PATENT DOCUMENTS

| 5,659,799 A | * | 8/1997 | Wu et al. ............. 710/57 |
| 5,758,057 A | | 5/1998 | Baba et al. |
| 6,297,887 B1 | | 10/2001 | Yamauchi |
| 6,681,285 B1 | * | 1/2004 | Ng ............. 710/309 |
| 7,054,790 B1 | * | 5/2006 | Rich ............. 702/186 |
| 7,254,674 B2 | | 8/2007 | Yamamoto et al. |
| 2004/0043755 A1 | | 3/2004 | Shimooka et al. |
| 2005/0271355 A1 | | 12/2005 | Gilor |

FOREIGN PATENT DOCUMENTS

| JP | 10-162505 | 6/1988 |
| JP | 03-080584 | 4/1991 |
| JP | 2004-086512 | 3/2004 |

* cited by examiner

*Primary Examiner*—Alford W Kindred
*Assistant Examiner*—Zachary K Huson
(74) *Attorney, Agent, or Firm*—Antonelli, Terry, Stout & Kraus, LLP.

(57) ABSTRACT

A storage system including: a controller connectable to a plurality of computers; and a plurality of storage devices connected to the controller, wherein the plurality of storage devices store a plurality of contents, wherein the controller receives a first request from a one of the plurality of computers which requests access to a first content of the plurality of contents, wherein the controller calculates a first data transfer rate of the first request, and wherein, based on the first data transfer rate, the controller dynamically controls settings of a first storage system resource during performing a first data transfer operation to satisfy the first request, to substantially maintain the access to the first content at substantially the first data transfer rate.

15 Claims, 10 Drawing Sheets

| LU # | START OF PARTITION | END OF PARTITION | REQUIRED TRANSFER RATE | REQUIRED RESPONSE TIME |
|---|---|---|---|---|
| 0 | 0 | 100 | 10Mbps | 30ms |
| 0 | 300 | 500 | 1.5Mbps | 20ms |
| 1 | 0 | 1000 | MPEG1 | 40ms |
| 2 | 0 | 2000 | HD | 30ms |

FIG. 5

| JOB # | JOB TYPE | JOB CREATION TIME | REQUIRED JOB START TIME | REQUIRED JOB END TIME | REQUIRED PROCESSING TIME |
|---|---|---|---|---|---|
| 0 | PREFETCH | 1000ms | 1100ms | 1120ms | 20ms |
| 1 | DESTAGE | 1500ms | 1600ms | 1620ms | 20ms |
| 2 | PREFETCH | 1600ms | 1650ms | 1680ms | 30ms |
| 3 | DESTAGE | 1800ms | 1920ms | 1940ms | 20ms |

STORAGE SYSTEM PROVIDING STREAM-ORIENTED PERFORMANCE ASSURANCE

CROSS-REFERENCES TO RELATED APPLICATIONS

This is a continuation of U.S. application Ser. No. 11/144,796, filed Jun. 6, 2005 now abandoned. This application relates to and claims priority from Japanese Patent Application No. 2005-107013, filed on Apr. 4, 2005. The entirety of the contents and subject matter of all of the above is incorporated herein by reference.

BACKGROUND OF THE INVENTION

The present invention relates to a technique for assuring qualities, such as transfer rate and response time, in the operation of a storage system.

In recent years, broadband communications services have enjoyed widespread use. With this trend, media-rich contents, such as digitized movies and news, have been delivered by streaming technology more increasingly. Storage equipment, a storage system, or a storage array system contained in a system for delivery of streaming media is required to assure the qualities of data transfer (hereinafter referred to as qualities of services (QoS)), such as transfer rate and response time, as well as the maximum throughput performance, in order to assure stable delivery of data to clients. Prior techniques regarding such quality assurance are disclosed in Patent References 1 to 3.

Patent Reference 1 discloses a technique that is intended to assure communications qualities from a computer to storage areas of storage equipment while taking into account the components inside the storage equipment and their respective performance values. In particular, a communications quality-setting device for assuring communications qualities between the storage equipment and a computer is disclosed in Patent Reference 1. This quality-setting device has an assured performance value-creating portion and an assured performance value-setting portion. The assured performance value-creating portion determines a performance value to be assured in each storage area, based on information about requests regarding assurance of the communications qualities, on the assurable performance value of the interface of the storage equipment, and on the assurable performance values of the storage areas of the storage equipment. The assured performance value-setting portion assures communications between the computer and the storage areas inside the storage equipment by giving an instruction to a storage controller to control the arrangement of data between the storage areas and the interface according to the performance values to be assured.

Patent Reference 2 discloses storage equipment for assuring the data transfer rate. Specifically, Patent Reference 2 discloses a technique using an expected data transfer rate and the transfer rate of each track is disclosed. The storage equipment is informed of a required, expected data transfer rate. This rate is registered in a management table. During formatting, the storage equipment recognizes bad sectors, if any, by writing and reading of data to and from each track. The writing time to the sectors, excluding the bad sectors, is registered in the management table. If this data transfer rate is less than the already registered, expected data transfer rate, it is recognized that no data can be stored in this storage equipment. Data is stored using only the sectors which can assure the expected transfer rate.

Patent Reference 3 discloses storage equipment having a timeout table and a data creation means. A time at which access to data recorded in the recording portion should be terminated is recorded in the timeout table. If the access does not end when the time stored in the timeout table has passed, the data creation means gains access to redundant data recorded in the recording portion and creates data.

[Patent Reference 1] JP-A-2004-86512
[Patent Reference 2] JP-A-10-162505
[Patent Reference 3] Japanese Patent No. 3,080,584

In the aforementioned streaming the delivery system, the computer offering services to customers makes plural accesses simultaneously (hereinafter referred to as multiple streaming accesses) to a storage device in which the media-contents are stored, in order to deliver the contents to plural customers simultaneously. The "streaming" indicates transfer of a unit of data. For example, one stream corresponds to data transfer of one content. It is necessary that storage equipment treating multiple streaming accesses assure a predetermined quality of service (QoS) for each stream.

In the Publications described above, the assurance of quality of service regarding one stream is mentioned. However, with respect to multiple streams, how quality of service of each individual stream is assured is not mentioned at all.

SUMMARY OF THE INVENTION

It is an object of the present invention to assure quality of service (QoS) for each stream in storage equipment capable of processing multiple streams.

One embodiment of the present invention is a storage system for receiving streaming accesses from a computer. The storage system itself detects the data transfer rates of streaming accesses. In this configuration, the storage system calculates a time required to execute internal processing, such as readout of data based on the detected data transfer rate, and processes the data based on the result.

More specifically, the storage system calculates the time required to execute the processing from the resources of the array system, from the performance, and from the detected data transfer rate. Where the data transfer rate detected from the resources available at that time cannot be sustained, the storage system may modify the configuration of the resources. An example of the resources is the buffer memory size. The performance can be the performance of a drive or the processing time taken when a fault occurs.

When plural streams are processed by the storage system, I/O operations are internally scheduled according to the required processing time.

In addition, the storage system can be so configured that a streaming access is judged according to whether it is a sequential access. Moreover, a streaming access may be judged based on the access destination.

Other structures of the present invention will become apparent from the following description of various embodiments of the invention. Obviously, the concept of the present invention is not limited to the embodiments described herein.

The storage system according to the present invention receives multiple streams and can stabilize the bit rates of the streams and the response time.

DESCRIPTION OF THE PREFERRED EMBODIMENTS

Figure 1:
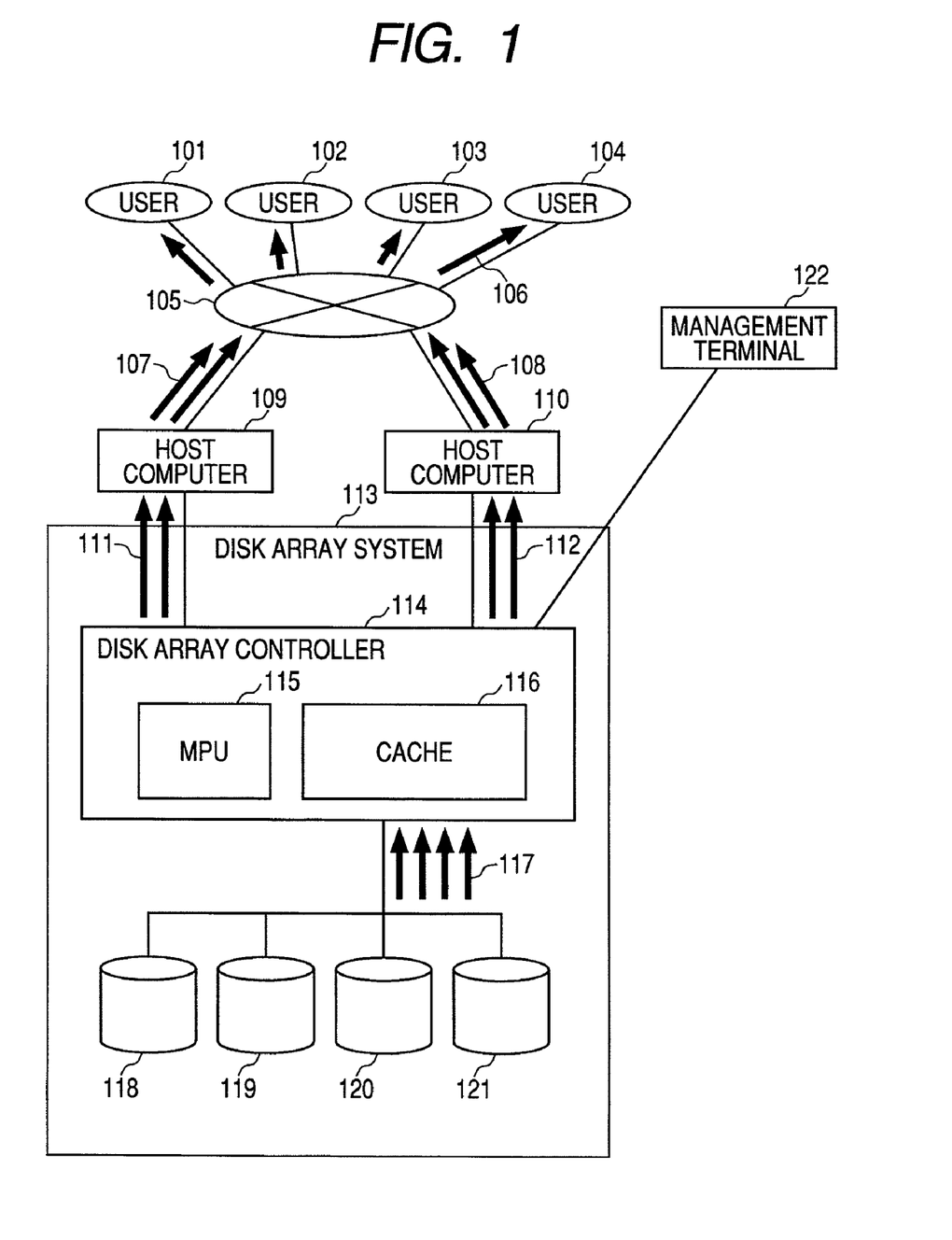
FIG. 1 is a block diagram showing an example of the configuration of a system in accordance with the present invention.

FIG. 1 shows a computer system according to a first embodiment of the present invention. The computer system has terminals (hereinafter simply referred to as users) 101-104 that are used by users, computers 109 and 110 (hereinafter may also be referred to as the host computers) that receive delivery requests from the users via the Internet 105, and a storage system 113 (hereinafter referred to as the disk array system) for processing access requests from the host computers. The users and host computers are interconnected via the Internet 105. The host computers and the disk array system 113 are connected via communications lines, which may be replaced by the Internet 105.

The disk array system 113 has a disk array controller 114 for controlling disk accesses and other operations and drive devices 118-121 for storing data. The disk array controller 114 has an MPU 115 for executing a control program and a cache memory 116 for storing data.

In the present embodiment, the disk array system 113 is shared between the plural host computers, which in turn receive content request accesses from plural users. Accordingly, the disk array system 113 is shared among a multiplicity of users. The disk array system 113 needs to process multiple streaming accesses.

Each of the host computers is a general computer and includes a processor, an interface with a network, and a memory. As mentioned previously, the host computer receives content delivery requests from users and requests the disk array system 113 to read out or write the media contents (hereinafter may be referred to as streaming accesses) according to the contents of the requests.

The user terminal may be a device capable of displaying media contents. For example, the terminal may be a cell phone, personal computer, or TV receiver. The device of the user terminal is equipped with an interface for connection with a network. Furthermore, the device includes a device for making communications with the host computers and a display unit.

The processing of multiple streams in the present embodiment will be described briefly below.

When multiple streams are received, the disk array system 113 of the present embodiment first detects the date transfer rates (hereinafter may be simply referred to as transfer rates) required by the individual streams. Then, the array system 113 determines assigned ones of the resources of the array system 113 necessary to maintain the data transfer rates of the individual streams. In this embodiment, the assigned resources are buffer sizes and disk I/O size for each individual stream. Then, based on the assigned resources, the array system 113 processes the multiple streams.

Where multiple streams are processed in practice, the disk array system 113 determines the order in which processing steps are performed while taking account of I/O processing of other streams such that processing responding to the received I/O request can be completed in a time sufficient to maintain the detected data transfer rate.

Figure 10:
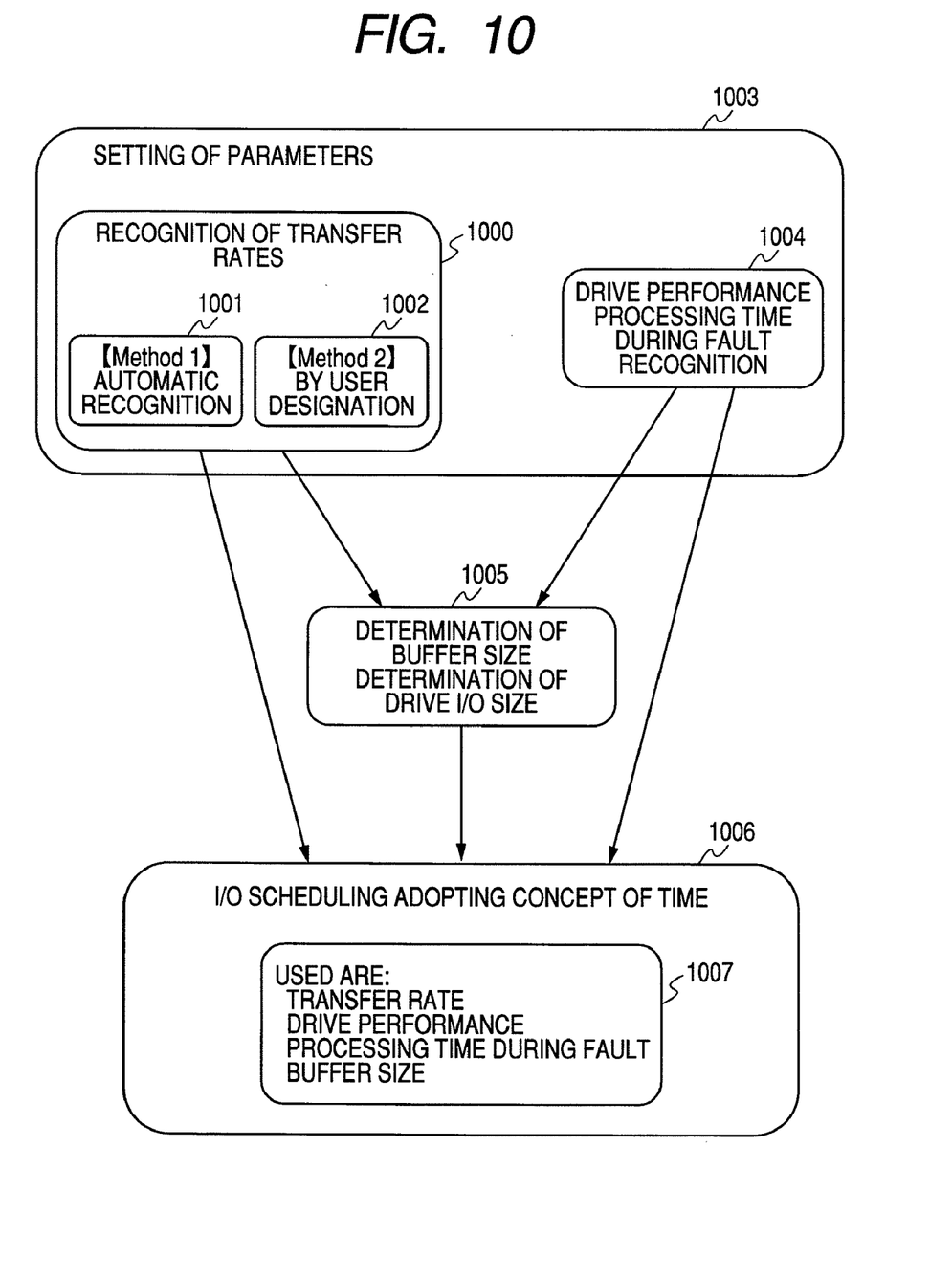
FIG. 10 is a diagram schematically illustrating relations among processing steps executed by an embodiment of the present invention.

FIG. 10 illustrates an example of a set of relations among processing steps of the processing briefly described above. The disk array system 113 achieves the processing by performing the processing steps shown in FIG. 10.

The processing briefly described above includes a processing step 1003 for setting parameters, a processing step 1005 for determining the buffer size and drive I/O size, and a processing step 1006 for performing I/O scheduling. That is, the disk array system 113 performs these processing steps. The processing step 1003 for setting parameters contains a processing substep 1000 for recognizing transfer rates and a processing substep 1004 for recognizing the drive performance and the processing time when a fault occurs.

In the processing step 1005 for determining the buffer size and drive I/O size, the disk array system 113 determines the buffer size and disk I/O size from the set parameters. In the processing step 1006 for performing I/O scheduling, the disk array system 113 schedules I/Os occurring in the multiple streams, using the set parameters and buffer size.

Based on these processing steps, the disk array system 113 recognizes the transfer rates of the individual streams contained in the multiple streams and assigns resources, which are matched to the transfer rates, to the streams. Furthermore, the array system 113 schedules and processes the I/Os of the multiple streams based on the resources. The processing steps are described in further detail below.

In the processing substep 1000 for recognizing transfer rates, the disk array system 113 recognizes the transfer rates of the streams issued to the array system 113 from a host computer. Processing for maintaining the transfer rates necessary for the streams is performed by the disk array controller 114 using the transfer rates recognized by the processing, as described above. More specifically, the disk array system 113 recognizes the transfer rates using either automatic recognition (1001) or user's indication (1002).

In the case of automatic recognition (1001), when a streaming access occurs from a host computer to the disk array system 113, the array system 113 first makes a decision as to whether the received access is a streaming access.

A method of discerning streaming accesses by the disk array system 113 is described below. Generally, streaming accesses are often sequential accesses (i.e., accesses to consecutive sectors). Accordingly, in the present embodiment, if the disk array system 113 determines that an access request from the host computer is a sequential access, the access is judged to be a streaming access.

One available method of judging a sequential access consists of checking the sequential access by the sequentially of addresses of data specified by the I/O received, for example, from the host computer. More specifically, when an I/O is received from the host computer, the disk array system 113 checks to see if required data exists in the cache memory. At this time, the disk array system 113 also checks to see if data in the sector indicated by the address (e.g., logical block address (LBA)) immediately preceding the sector in which the required data is stored exists in the cache memory. If the data exists, the received I/O is judged to be one stream access.

If the access is judged as a streaming access, the disk array system 113 calculates the bit rate. First, the array system 113 sets its maximum transfer rate as a parameter. I/O operations with the host computer regarding the streaming access are executed at the maximum transfer rate for a given period. Then, the array system 113 measures the amount of data actually transferred to and from the host computer regarding the streaming access for the given period. The array system 113 finds the transfer rate regarding the stream from the measured value. The found transfer rate is taken as the transfer rate of this stream. Thereafter, the disk array system transfers data based on the streaming access while controlling itself so as to maintain the found data transfer rate.

In streaming delivery, data transfer rates required by a delivery request from users to the host computer are often constant among streams. In this case, the transfer rates required by transfer requests from the host computer to the disk array system 113 are also constant among streams. Therefore, the transfer rate of each stream can be recognized by recording the transfer rate of each stream during a given time in the disk array system.

The given time indicates an arbitrary time interval until the state of transmission of data settles down. This may be specified by the administrator or set as follows. The storage equipment repeatedly calculates the bit rate at regular intervals of time (e.g., at intervals of 30 seconds) and takes the time when the calculated variation decreases below a certain value as the given time.

As another embodiment of the present invention, the disk array system 113 may determine whether the access is a streaming access, according to whether it is a request for access to a certain address or address area, not according to whether it is a sequential access. In a simple method, the disk array system 113 grasps the head address (or address area) of content stored in the array system 113, and, if there is an access to the head address (or address area), the array system 113 determines that the access is a streaming access.

However, it is unrealistic to assume that the disk array system 113 will grasp the head addresses of all of the contents. Therefore, the decision as to whether the access is a streaming access is made according to whether there is a request for access to a unit of managed storage sector (e.g., a logical unit (LU)) in the disk array system 113. For instance, where access is made to a certain LU, the disk array system 113 recognizes this access as a streaming access and starts to calculate the data transfer rate. In this case, the administrator may manage the disk array system 113 in such a way that contents which require a similar data transfer rate are stored in the same LU.

In addition, the disk array system 113 may hold information about a once calculated data transfer rate and set the data transfer rate using the held information, i.e., calculation of the data transfer rate is omitted, in a case where there is another access to the same content. In this case, the disk array system 113 must record information about the relation between the content and the data transfer rate. For example, the head address (or head address of the LU) of the content and the data transfer rate may be interrelated and recorded.

Similar processing is performed in a case where plural streaming accesses are received. Where a streaming access is judged by a sequential access, the disk array system 113 judges different sequential accesses (i.e., including plural accesses to the same content and different accesses to different contents) as different streaming accesses.

On the other hand, where a streaming access is judged by an address (content or LU), the disk array system 113 judges accesses to different addresses as different streaming accesses. In this case, if the accesses are judged as plural accesses to the same address, the disk array system 113 calculates only the data transfer rate of any one of plural streaming accesses. The result can be applied to the plural streaming accesses.

The disk array system 113 stores information about the transfer rates of the recognized individual streams in the disk array controller 114 in response to each stream.

Figure 4:
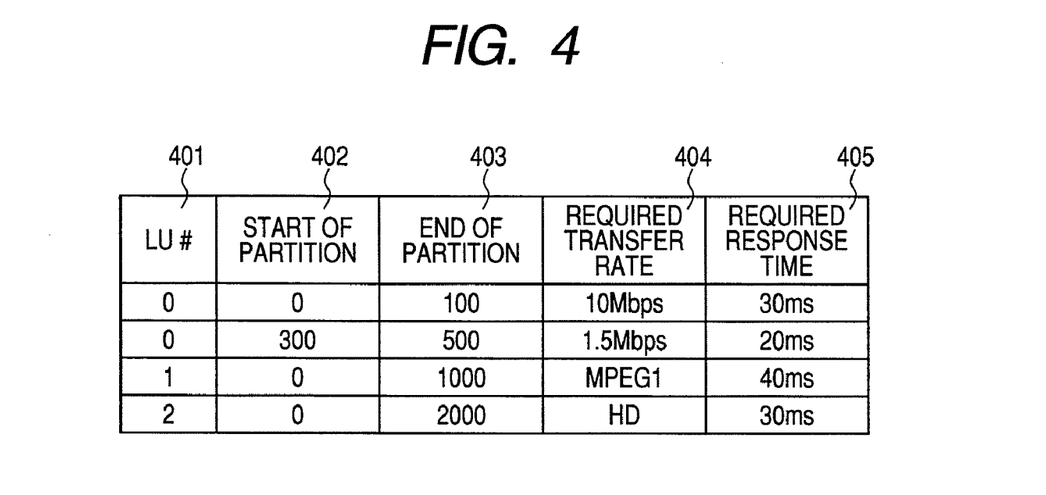
FIG. 4 is a diagram showing a transfer rate setting table.

The method (1002) using user's indication will now be described with reference to FIG. 4. A transfer rate either required by the administrator of the disk array system 113 or calculated by the host computer executing an agent program is set into the disk array system 113. Where the administrator of the array system 113 sets the transfer rate, the administrator gives an instruction to the array system 113 through the management terminal 122 to cause the disk array controller 114 within the disk array system 113 to set values into the table shown in FIG. 4, which is present within the controller 114. Where the rate is set by the host computer executing the agent program, the host computer receives transfer rate information from a program that controls delivery made by a delivery server and gives an instruction to the disk array system 113 to set the transfer rate information in-band. More specifically, the host computer sends out a special command, which is received by the disk array system 113. The array system 113 then sets values specified as in the table shown in FIG. 4.

The transfer rate is specified for each LU as indicated by column 401 or for each area or sector as given by columns 402 and 403. With respect to the transfer rate of 404, the value of the bit rate is directly set, such as 10 Mbps or 1.5 Mbps, or information about a compression rate standard, such as MPEG1, MPEG2, MPEG4, or high definition (HD), is set. In the latter case, the disk array system 113 judges the transfer rate from these standards. Furthermore, the required response time in column 405 of each I/O corresponding to each stream can be set for each LU or for each area, other than the transfer rate.

In the processing substep 1004 for recognizing the drive performance and a processing time taken when a fault occurs, the disk array controller 114 recognizes information about the performance of the drive and information about the processing time taken when a fault occurs. The type of drive inside the disk array system 113 has been previously determined. Information about the performance of the drive, such as the seek time and the data transfer time, have values intrinsic to the drive. These values have been previously set into the disk array controller 114. The controller 114 finds information about the drive used in practice from these preset values and sets the information into the table within the disk array controller 114. In addition, information about the processing time taken when a fault occurs has been previously determined. These kinds of information are set in the table within the disk array controller 114. The controller 114 performs processing taking into account the information about the performance of the drive and the processing time taken when a fault occurs when I/O processing is performed.

These kinds of information are used to find the forecasted end time of the command issued to the drive. Also, the forecasted end time is used in the processing step 1006 performing I/O scheduling.

Figure 2:
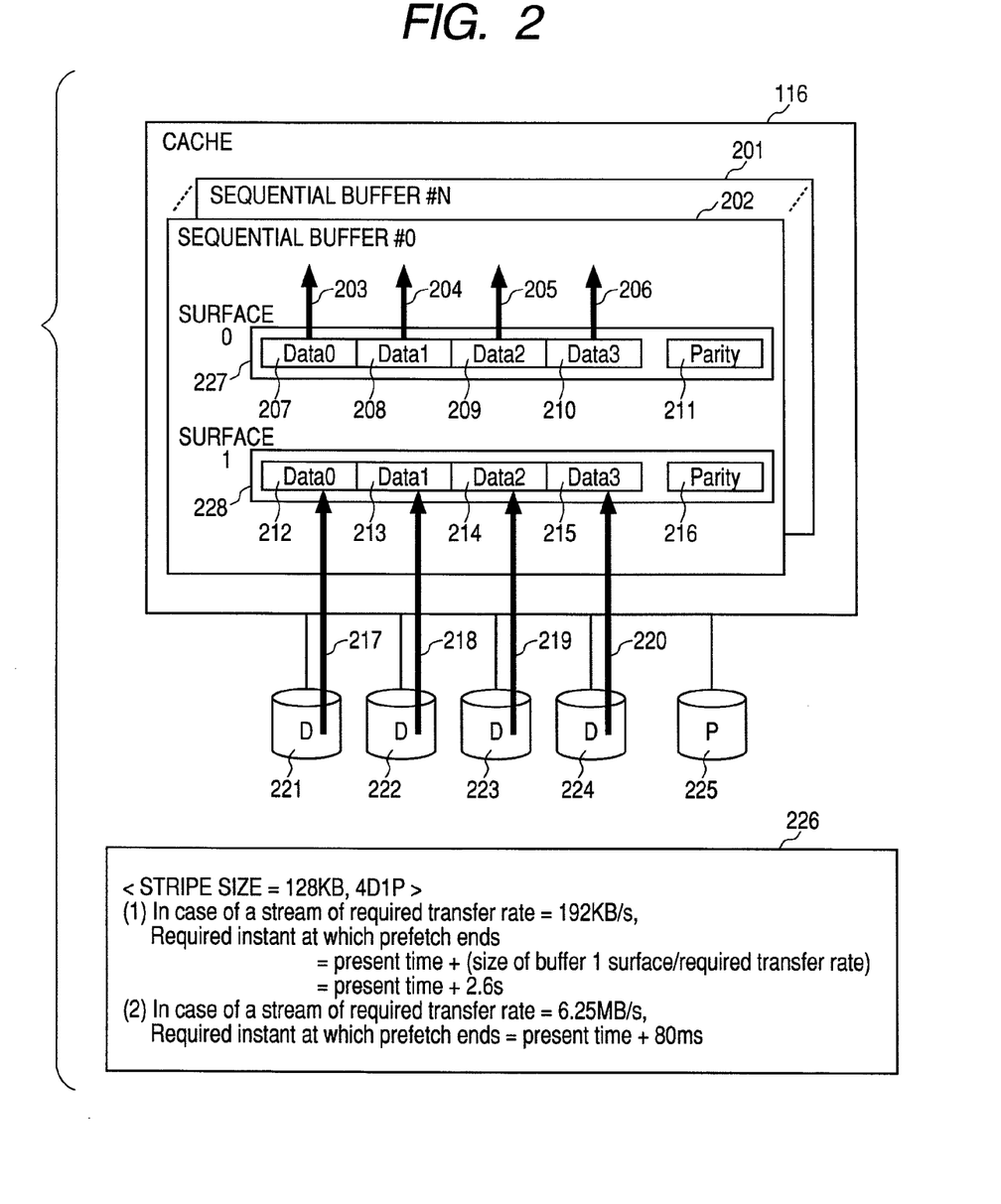
FIG. 2 is a diagram schematically illustrating the processing of read streams.
Figure 3:
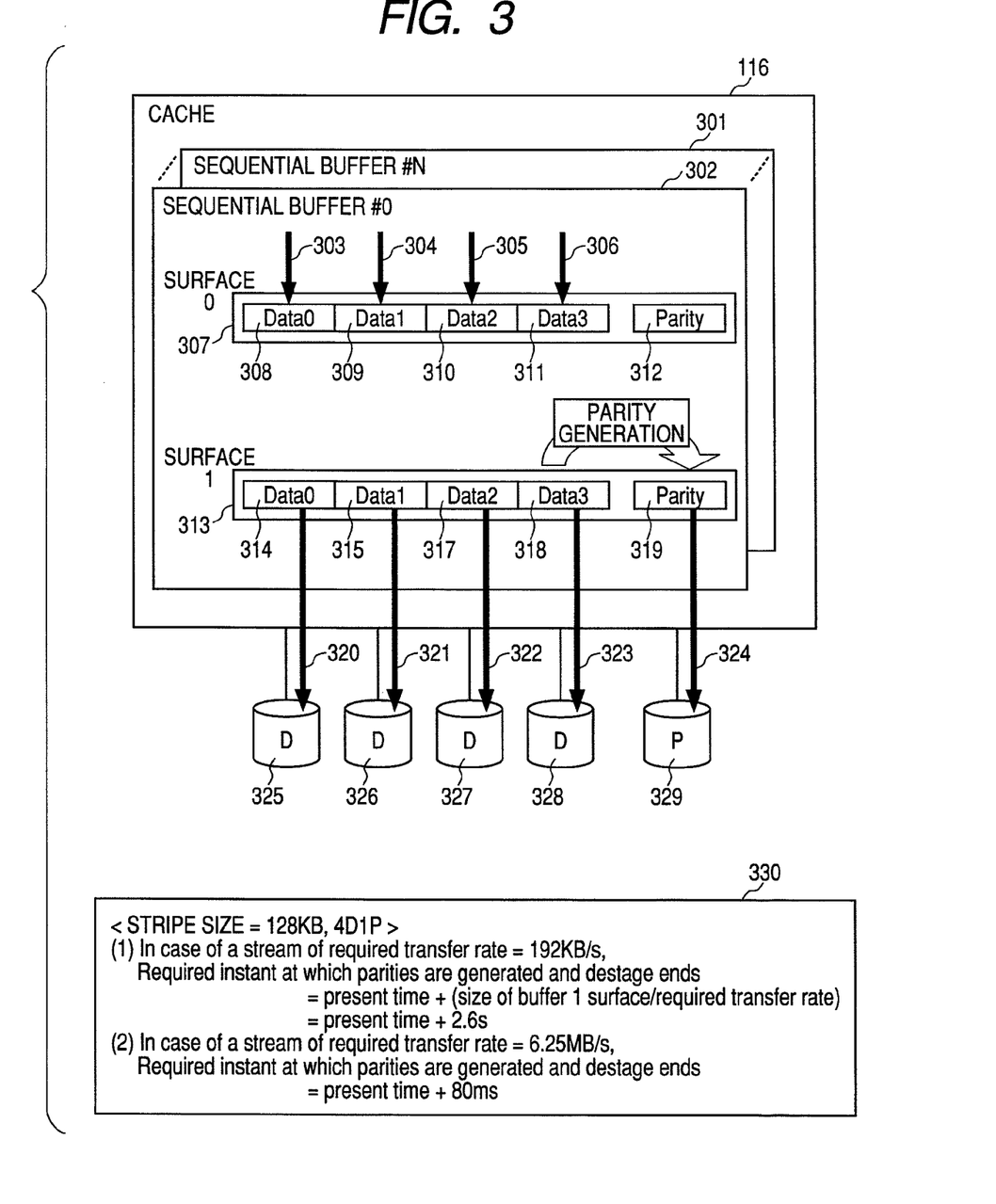
FIG. 3 is a diagram schematically illustrating the processing of write streams.

The disk array system 113 performs the processing step 1005 for determining the buffer size and disk I/O size, using the parameters set in the processing step 1003. FIGS. 2 and 3 schematically illustrate an example of a method of determining the buffer size during read and write operations and an example of a method using the buffer.

An example of a method of using the buffer and determining the buffer size when multiple streaming accesses regarding data readout are received from the host computer will be described with reference to FIG. 2. It is assumed that multiple streaming accesses to the disk array system 113 are generated and that the streams are read accesses. Generally, streaming accesses for reading out data are consecutively read accesses (hereinafter referred to as sequential read accesses). Therefore, to cope with streams for reading out data, the disk array system 113 has sequential buffers within the cache memory 116, as shown in FIG. 2. The number of sequential buffers is N, and each buffer corresponds to one stream.

In the disk array system 113, each sequential buffer is formed by plural surfaces. Each of these surfaces indicates a physical unit of storage forming the cache memory 116. For example, where a memory having storage elements mounted on the front and rear surfaces of a single substrate is used, the front and rear surfaces correspond to the "surfaces". In FIG. 2, each sequential buffer is formed by surface 0 (for example, front surface 227) and surface 1 (for example, rear surface 228). Data about one stripe row is stored on each surface of the sequential buffer. The "stripe row" indicates a unit of stored data when an array configuration is formed in storage equipment.

FIG. 2 shows a case in which the disk array system 113 has an array configuration of the RAID4 or RAID5 type with 4D1P (four data disks and 1 parity disk). Surface 0 of one sequential buffer has sectors 207-210 for storing data and a sector 211 for storing parity data. Similarly, surface 1 has sectors 212-215 for storing data and a sector 216 for storing parity data.

At the time of sequential reading, an operation for reading successive sectors in a storage area possessed by the disk array system 113 takes place. In this case, the array system 113 performs a prefetch, which means that the time of access to the drive in the disk array system 113 is hidden by reading data into the cache memory 116 from the drive by means of the disk array controller 114 prior to generation of a read request from the host computer in a case where a data readout location can be forecasted. In the case of a sequential read, the data readout location can be forecasted, and, therefore, it can be considered that this prefetch occurs prior to data readout. The prefetch is also adopted in the present embodiment.

In the present embodiment, the disk array system 113 prefetches each stripe row on surface 0 or 1 on a one-by-one basis. Accordingly, the disk array controller 114 does not issue a request for a read to the driver in response to every request from the host computer, but issues a request for a read to the drives 221-224 for every stripe row. When a read request from the host computer is issued in practice, the disk array controller 114 transfers data corresponding to the read request to the host computer, if the data corresponding to the read request exists in the sequential buffer. If the data does not exist in the buffer, the controller 114 performs a prefetch, reads data about the corresponding stripe rows from the drives, and transfers the data to the host computer.

When transfer of data stored on one surface to the host computer is completed, the disk array controller 114 performs the next prefetch operation for the corresponding buffer. While data stored on one surface by a prefetch is being transferred to the host computer, data is stored on the other surface. For this purpose, the disk array controller 114 performs prefetch for this surface. Thus, the disk array system 113 can send data to the host computer without interruption. Conversely speaking, unless prefetch of data for the other surface is completed at the time when data transfer to the host computer regarding one surface ends, data transfer to the host computer is delayed until prefetch of data for the other surface is completed. In this case, there is the danger that the disk array system 113 cannot assure the data transfer rate.

At this time, the disk array system 113 determines the sizes of sequential buffers assigned to individual read streams based on information obtained by the previously described processing step 1003 for setting parameters. More specifically, the array system 113 determines the sizes of the sequential buffers to assure the transfer rates of the read streams which have been detected or set.

The lower portion (226) of FIG. 2 illustrates the relation between the transfer rate of streams set by the processing step 1003 and the time at which the prefetch ends. Generally, the rate at which data is required to be transferred to the host computer cannot be maintained (i.e., data to be transferred ceases to be present in the cache) unless the prefetch ends within a period given by (size of one buffer surface/required transfer rate). In the example shown at 226, the stripe size is 128 KB, the array configuration is 4D1P, the stripe row size is 512 KB, and the size of the data area of one surface of the sequential buffer is 512 KB. In case (1), the transfer rate is 192 KB/s. In case (2), the transfer rate is 6.25 MB/s. In the two cases, the prefetch end times (hereinafter may also be referred to as required prefetch end times) are shown.

Where the required transfer rate is 192 KB/s, the above-described calculational formula indicates that if the prefetch ends within 2.6 s, the transfer rate required by the host computer can be assured. Furthermore, where the required transfer rate is 6.25 MB/s, the prefetch for 1 stripe row must be terminated within 80 ms.

The disk array system 113 first calculates the required prefetch end time using the calculational formula, based on the size of the sequential buffer assigned to read streams at the present time. The array system 113 checks to see whether the disk array controller 114 can complete the prefetch within the calculated, required prefetch end time by referring to the drive performance and fault processing time parameters set in the parameter-setting processing step 1003.

In the example shown in FIG. 3, for example, the transfer rate is 6.25 MB/s, the array configuration is 4D1P, the stripe size is 128 KB, and one surface of the buffer is 1 stripe row (128 KB*4=512 KB). In this case, it takes 512 KB/6.25 MB=80 ms for the host computer to read data of 512 KB on one surface of the buffer. Accordingly, if the prefetch of one surface of the buffer ends within 80 ms, the transfer rate required by the host computer can be maintained. Since the prefetch is performed for every stripe row, the transfer rate can be maintained if the request for a read of 128 KB to each drive ends within 80 ms.

The disk array controller 114 can find the read time of the drive for one read request according to the information about the drive performance.

It is assumed, for example, that the drive has a command time of 0.5 ms, a rotation waiting time of 2 ms, a seek time of 3.8 ms, and an internal transfer time of 0.24 ms. The data transfer time to the disk array controller is 0.15 ms. One drive I/O time taken to handle one read request is about 7 ms. Accordingly, unless plural commands are issued to the drive or a fault has occurred, this drive can handle the read request of 128 KB within 80 ms.

However, where plural (e.g., 10) commands are issued to the drive, a time of 11×7 ms=77 ms elapses until a final (i.e., eleventh) command is issued and data corresponding to the command is sent. In this case, it is difficult for the drive to handle the read request of 128 KB within 80 ms. The processing time required when a fault occurs is considered similarly. For example, where generation of a drive fault is found and it is necessary to read in parity data again for data recovery, corresponding drive accesses are generated. This delays the prefetch end time.

If the disk array controller 114 can perform a prefetch within the calculated, required prefetch end time as a result of considerations of the drive performance and fault-processing time, as described previously, the disk array system 113 uses the already assigned sequential buffers without modifying the buffer size.

On the other hand, in a case where it is impossible to perform a prefetch within the required prefetch end time calculated by the disk array controller 114, the disk array system 113 increases the size of the sequential buffers assigned to streams, taking into account the drive performance and the fault-processing time such that the required prefetch end time ends within the processing time of the controller 114. For example, if the size of one buffer surface is increased to 1 MB corresponding to 2 stripe rows in 226, the required prefetch end time of (1) increases to 5.2 s and the required prefetch end time of (2) increases to 160 ms.

In the above-described example, with respect to a drive to which 10 commands, for example, are sent, if the buffer size is set to 1 MB, for example, to maintain the transfer rate, then the required prefetch end time is 160 ms. Therefore, the transfer rate can be maintained.

FIG. 3 illustrates the case where multiple streaming access requests from the host computer are writes. In the case of a write request (hereinafter may be referred to as writing stream), streams are sequential accesses in the same way as read streams. Accordingly, the disk array system 113 assigns sequential buffers to write streams in the same way as shown in FIG. 2. Furthermore, one sequential buffer is assigned to two or more surfaces in the same way as shown in FIG. 2.

In the case of write streams, after receiving data about one surface from the host computer, the disk array system 113 generates parity only from data received from the host computer and writes data and parity about one stripe row into the drive. After storing the data about one surface, the disk array system 113 activates processing for the surface to generate parity and write into the drive (destaging). Meanwhile, if processing for one surface to generate parity and destage to the drive is started, the disk array system 113 receives writing data from the host computer, using another surface.

Accordingly, if parity generation and destage for one surface ends until data received from the host computer is stored onto the other surface, the disk array system 113 can receive data without causing a write request from the host computer to wait.

Therefore, using a calculational formula similar to the formula shown in FIG. 2, the disk array system 113 calculates the time taken to generate parity and perform a destage operation based on the size of the sequential buffer given to write streams at the present time. The array system 113 checks to see whether the disk array controller 114 can write data within the calculated time, using the information about the drive performance and fault-processing time.

Where the disk array controller 114 cannot write data within the calculated time, the disk array system 113 increases the size of the sequential buffer to such an extent that the disk array controller 114 affords the time taken to write data.

The lower portion (330) of FIG. 3 illustrates an example of a set of relations among parity generation, destage processing time, buffer size, and transfer rate. The stripe size is 128 KB. The array configuration is 4D1P. The size on one surface of the buffer is 512 KB. In case (1), the transfer rate from the host computer is 192 KB/s. In case (2), the transfer rate is 6.25 MB/s. Where the transfer rate is 192 KB/s, the required end time of the processing for parity generation and destage is calculated in the same way as in the case of reads and results in 2.6 s. Where the transfer rate is 6.25 MB/s, the time is 80 ms. In the same way as in the case of reads illustrated in FIG. 2, it is checked to determine whether the disk array controller 114 can complete the destage process within the calculated, required end time from the relation to the drive performance and fault-processing time. If it is impossible, the buffer size is increased.

Figure 11:
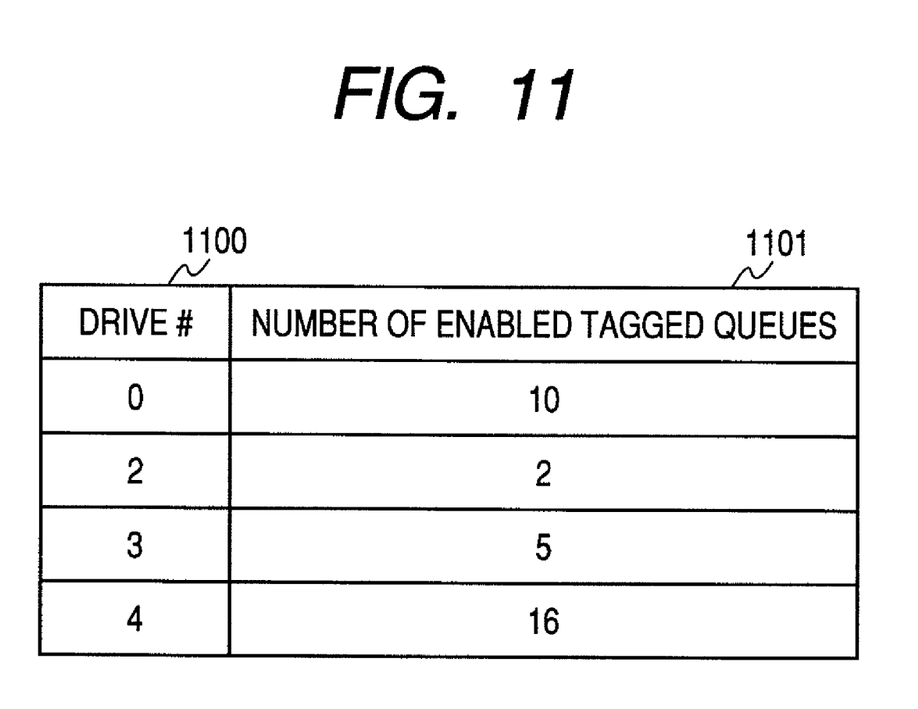
FIG. 11 is a diagram showing a table of numbers of enabled tagged queues.

In the processing substep 1004 for recognizing the drive performance and the processing time when a fault occurs, the performance parameters, such as the seek time and transfer time of the drive, alone are set. In addition, the number of enabled tagged queues for each drive is set. FIG. 11 shows an example of a set of set numbers of enabled tagged queues for each drive. The table is loaded in the disk array controller 114. The controller 114 issues commands to the drive. In response to some of these commands, no completion acknowledgements are sent back to the controller 114 from the drive. The "number of tagged queues" is the number of these commands which have not yet replied, i.e., the number of commands being processed within the drive. The number of enabled tagged queues shown in FIG. 11 indicates the limit value of the number of tagged queues.

The disk array controller 114 refers to the table of FIG. 11 when an I/O is issued to the drive and checks to determine whether the present number of tagged queues has reached the limit number put in the table. If the number of tagged queues has reached the limit value, the disk array controller 114 suppresses issuance of I/Os to the drive. This control is used to assure the transfer rate of streams that have a high degree of urgency and to assure the response time.

Generally, the I/O response time from the drive (hereinafter may also be referred to as the drive I/O response time) increases roughly in proportion to the number of tagged queues. Therefore, if the number of tagged queues is unlimitedly permitted, it is highly likely that the drive I/O response time increases beyond the required end time of the processing for prefetch and destage shown in FIGS. 2 and 3. To circumvent this situation, the number of tagged queues to the drive is suppressed using the values shown in FIG. 11, thus assuring maximum drive response times for all of the I/Os.

The maximum drive response time is the drive's response time necessary to maintain the transfer rate to the host computer. That is, it is the maximum allowable value of the time taken from the time when a read command is issued to the drive until data is sent back. Where 10 commands have been already queued in the drive when an I/O is issued, as mentioned previously, it takes about 70 ms until data about the commands is returned because the processing time of one I/O drive is almost fixed (about 7 ms in the above example). This is the maximum drive response time in a case where the number of tagged queues is 10. On the other hand, if the number of tagged queues is 0, data is sent in about 7 ms.

That is, if the number of tagged queues is limited, the maximum value of the processing time required by the drive to process one command can be forecasted. If issued commands are prioritized in the disk array controller 114 (e.g., if a command of a higher priority (command arising from a stream of a high bit rate) than commands whose issuance to the drive is made to wait, for example, by queuing limitation within the disk array controller), the command of a higher priority is issued to the drive with higher priority than the waiting commands. If this operation is performed, it can be assured that the response time of the drive in response to the command of a higher priority is increased up to the drive processing time (maximum drive response time), that is, the number of queued commands*time taken to process 1 command.

The I/O whose issuance to the drive is suppressed is made to wait in the drive queue. Where a job having a short required end time, such as a prefetch caused by a high transfer rate stream, is produced, the processing is terminated within the required end time by registering it in the head position of the drive queue.

In the processing step 1005 for determining the drive I/O size, the disk array system 113 determines the drive I/O size based on the size of the sequential buffer determined by the processing for determining the buffer size. The "drive I/O size" indicates the amount of data read out or written in one operation set by a data readout (or write) command issued to the drive from the disk array controller 114. Accordingly, if the drive I/O size is increased, the throughput performance in reading or writing the drive is improved.

Therefore, where multiple streams required to be sent at high transfer rates are received, the drive efficiency and performance can be enhanced by increasing the drive I/O size. With respect to a reading operation, the disk array controller 114 issues a command requesting a prefetch for one surface of the buffer to the drive. With respect to a writing operation, the controller issues a command requesting a destage for one surface of the buffer to the drive. Accordingly, the I/O size to the drive is increased by increasing the size of the sequential buffer.

The processing step 1006 for performing I/O scheduling will be described next. In the processing step 1006 for I/O scheduling according to the present embodiment, a method illustrated at 1007 is used. The disk array controller 114 prioritizes jobs (such as a prefetch request for the drive) regarding the processing of multiple streams using the parameters illustrated at 1007, based on the required end time of each job and executes the jobs. In this way, the multiple streams can be processed while assuring the transfer rates of the streams. The processing will be described in further detail below with reference to FIGS. 6-9.

Figure 6:
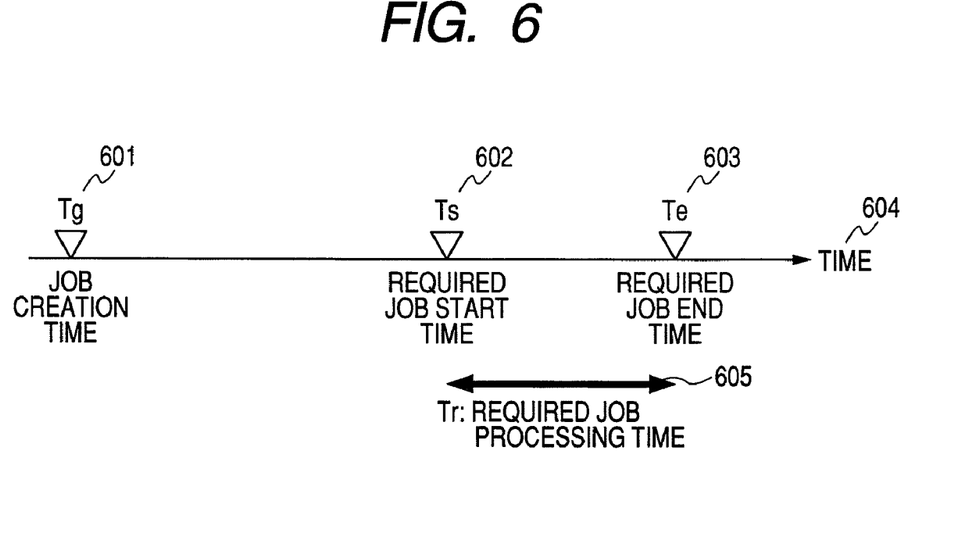
FIG. 6 is a diagram illustrating relations among an instant at which a job is created, an instant at which the job is required to be started, an instant at which the job is required to be terminated, and a time required to complete the job.

FIG. 6 is a diagram illustrating the relation between processing steps performed by the disk array controller 114 and a processing time. In FIG. 6, as described previously, a unit of processing performed by the array controller is represented as a job. It is assumed that the aforementioned prefetch for a reading operation is implemented by a prefetch job. The processing for parity generation and destage for a writing operation is performed by a destage job.

At the instant of time Tg (601), the disk array controller 114 creates a job in response to the processing of a stream. This indicates, for example, an instant of time at which the disk array controller 114 creates a prefetch job for reading data about one buffer surface from the drive when a sequential read occurs, for example, based on a read stream. In the case of a write stream, it corresponds to an instant of time at which the disk array controller 114 creates a destage job after data about one buffer surface has been stored.

The job created at instant Tg is required to be terminated at an instant of time Te (603). As described previously, the required end time Te of the job is found from the size of the sequential buffer and the required transfer rate of the stream. Unless each job can be completed before this time, the sequential buffer will be depleted. This will delay data transfer to the host computer, or data from the host computer will not be accepted.

The period of time Tr (605) indicates a time taken to process the job generated at the instant Tg. The time Tr is found based on the number of queued commands to the drive, the drive performance, and information about the fault processing time, as described previously.

The instant of time Ts (602) indicates a time at which the job found from Te-Tr must be started. More particularly, the transfer rate of the corresponding stream cannot be assured unless the disk array system 113 starts the processing of the job at the instant Ts at the latest.

The disk array system 113 computes the instant Ts at all times for all of the multiple streams. The array system 113 executes the sequence of jobs from the job of the stream corresponding to the earliest instant Ts at that time according to the result of the computation. Accordingly, the order in which the jobs are created may be different from the order in which they are executed. That is, the jobs are prioritized in the order of their start times Ts.

In the present embodiment, it is assumed that the execution time of one job is substantially identical with the execution times of other jobs. Under this assumption, the required job start time (Ts) is found from the required job end time Te. The order of execution of the jobs is based on the order of their start instants of time Ts. That is, it is assumed that a job having an earlier Te has an earlier start time Ts. However, the execution time of one job may be different from the execution time of another job. In this case, the job end times Te may be simply compared in terms of their order, and the jobs may be executed according to the order of the job end times.

In this way, as attributes of each job, its time-related parameters, such as the start time, end time, and processing time, are introduced. As a result, processing jobs of a multiplicity of streams having different required transfer rates can be prioritized. Hence, streams having a higher priority in terms of time can be processed with priority.

Figure 5:
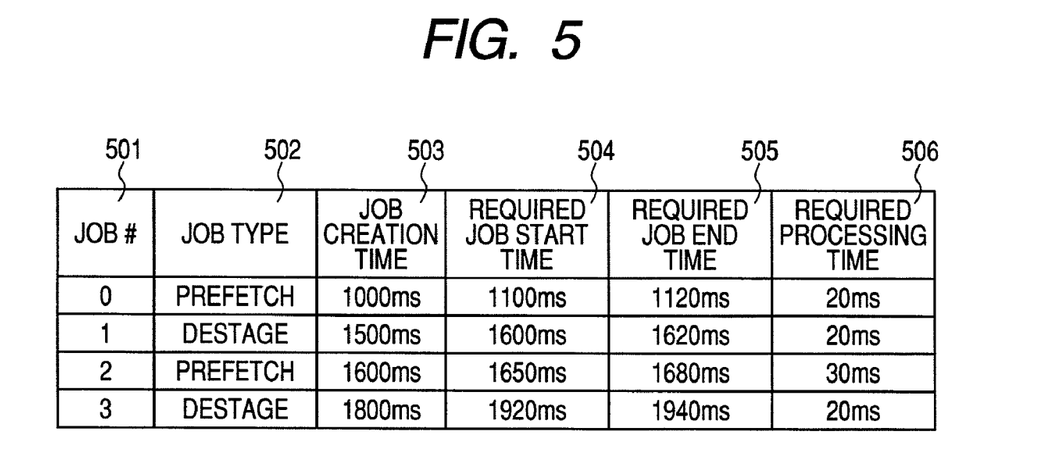
FIG. 5 is a diagram showing a job management table.

The aforementioned job creation time, job start time, required job end time, and required execution time are loaded in a job management table, as shown in FIG. 5. This table is stored in the disk array controller 114. Based on the required job start time Ts registered in the column 504 of FIG. 5, the disk array controller 114 prioritizes jobs in the order #1, #2, #3, and #4.

An example of the procedure of the processing step 1006 for performing I/O scheduling by the disk array controller 114 will be described below.

Figure 7:
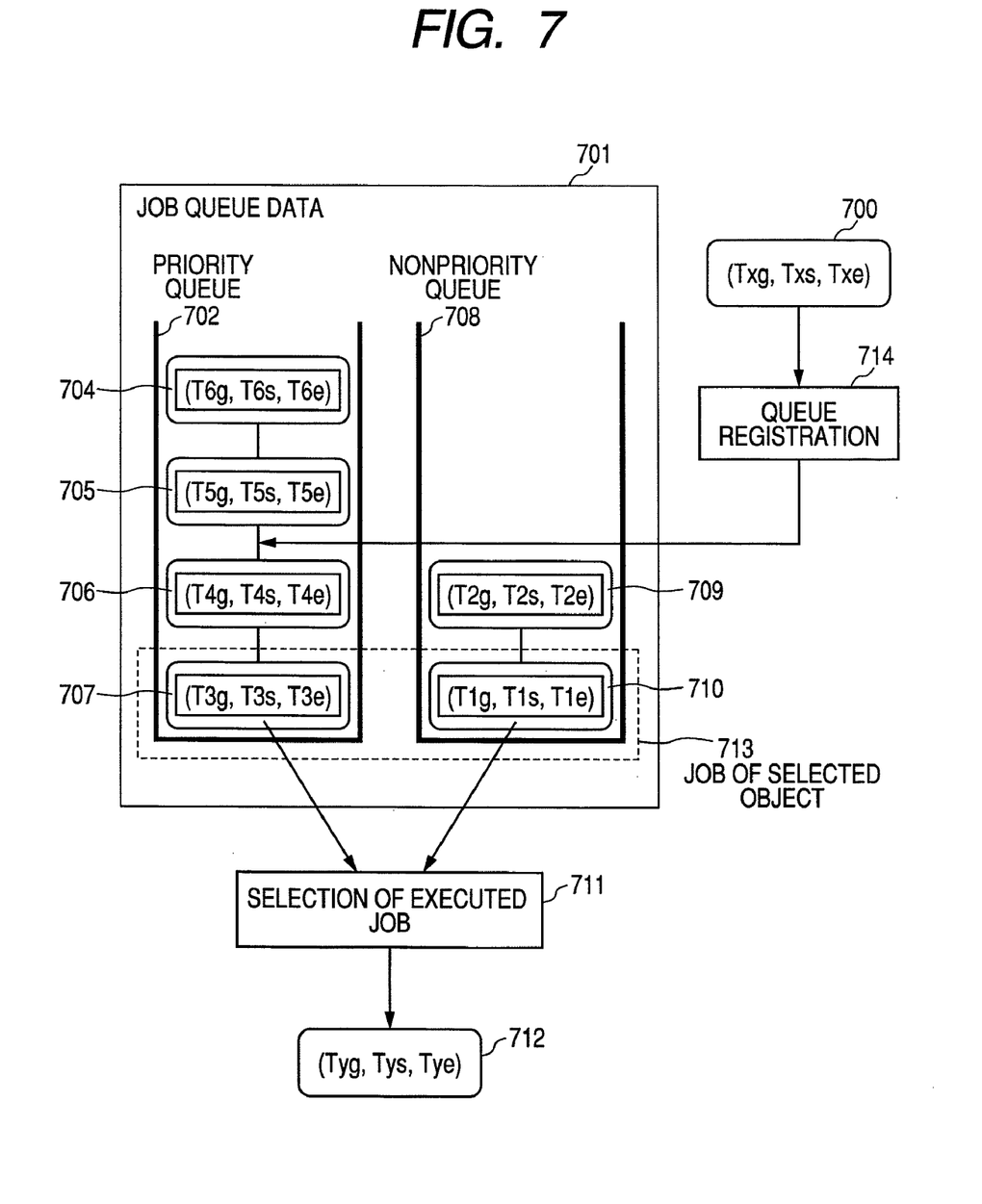
FIG. 7 is a diagram schematically illustrating registration of jobs in a priority queue and a nonpriority queue and job selection.

FIG. 7 is a diagram summarily illustrating scheduling of jobs in the disk array controller 114. When a stream-processing request is received, the array controller 114 creates a job (e.g., a command for causing the drive to perform processing) corresponding to the stream. The array controller 114 previously sets a queue area in the cache memory 116. The controller 114 registers a created job as one queue in the queue area.

Referring still to FIG. 7, the queue area of the disk array controller 114 includes two areas: priority queue 702 and nonpriority queue 708. For example, prefetch jobs used in streaming and queues regarding destage jobs are registered in the priority queue 702. On the other hand, queues regarding jobs in response to random I/Os that are different from sequential access in streaming are stored in the nonpriority queue. In a further embodiment of the present invention, none of the priority and nonpriority queues are provided.

Where the disk array system 113 is so set that priority is given to reading, jobs regarding reading may be registered in the priority queue, while jobs other than reads, such as writing, may be stored in the nonpriority queue.

Based on the conditions described above, the disk array controller 114 determines in which of the priority and nonpriority queues is the created job (700 in the figure) registered (registration 714 in either queue). Jobs are registered in the queues (704-710). Furthermore, the array controller 114 selects jobs from the queues to execute the jobs (selection 711 for executing jobs) and executes the selected jobs (712).

Figure 8:
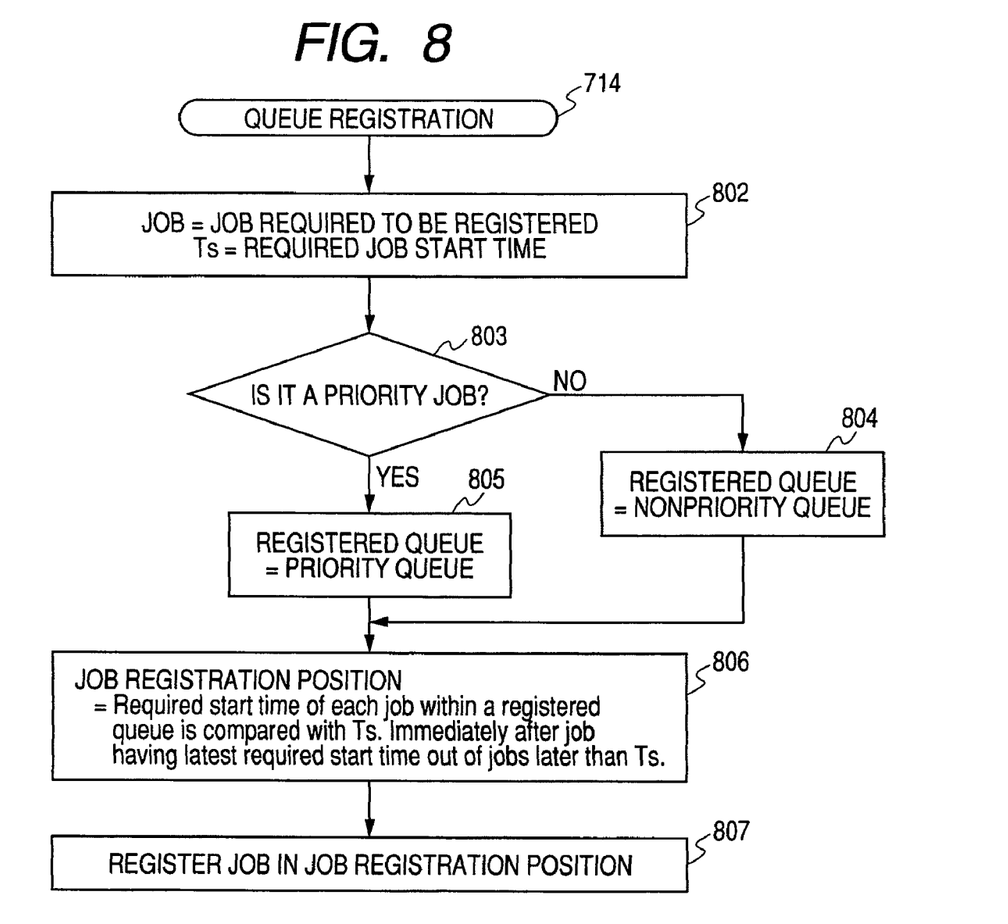
FIG. 8 is a flowchart illustrating a procedure for registration in queues.

A detailed example of the procedure of the queue registration 714 and executed job selection 711 will be described next. FIG. 8 is a diagram showing an example of the processing procedure of the queue registration 714 performed by the disk array controller 114. The controller 114 first defines a job to be registered (hereinafter referred to as the registration requesting job) as JOB. At this time, the controller 114 sets information about Tg (job creation time), Ts (required start time), and Te (required end time) to the JOB regarding the registration requesting job, based on the information registered in the table shown in FIG. 5 (step 802).

Then, the disk array controller 114 makes a decision as to whether the JOB is a job (hereinafter referred to as the priority job) registered in the priority queue or a job (hereinafter referred to as the nonpriority job) registered in the nonpriority queue (step 803).

Depending on the result of the decision made in step 803, the disk array controller 114 takes the registered queue as a nonpriority queue if the JOB is a nonpriority job (step 804) and takes the registered queue as a priority queue if the JOB is a priority job (step 805). After the processing of the step 804 or 805, the controller 114 determines the position inside the queue in which the JOB is registered. Specifically, the controller 114 compares the required start time of each job already registered in the registered queue and the Ts set in the JOB. Of the jobs having required start times earlier than Ts, the position located immediately after the job having the latest required start time is taken as the registration position of the JOB (step 806). Finally, the controller 114 registers the JOB in the position determined in step 806 (step 807).

Figure 9:
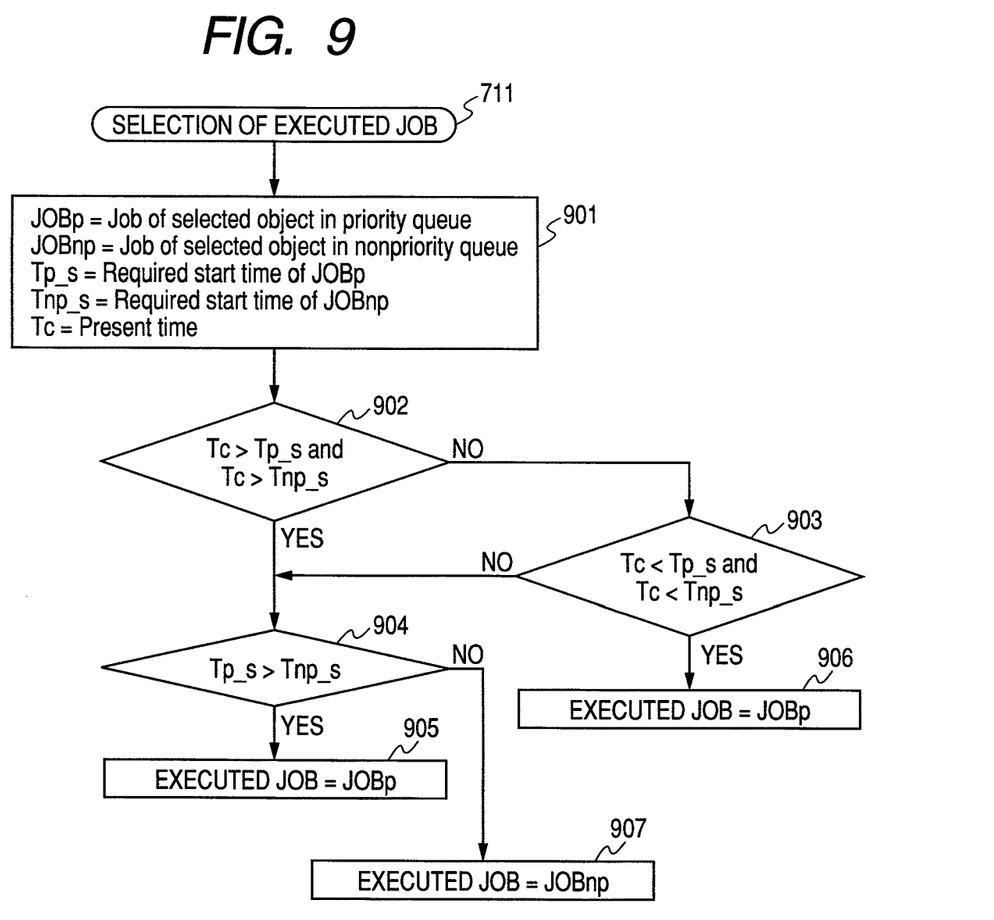
FIG. 9 is a flowchart illustrating an example of a procedure for selecting executed jobs.

FIG. 9 is a flowchart illustrating an example of the procedure of processing of the selection 711 for executing jobs. In the processing of the selection 711, the disk array controller 114 selects a job with the highest priority from the priority and nonpriority queues. Since jobs in the priority and nonpriority queues are registered using start time Ts, the jobs are prioritized in each queue. Therefore, in selecting a job to be executed, the jobs in the heads of the priority and nonpriority queues are selected. Of these two jobs, the job with a higher priority is selected. With respect to processing such as random access registered in the nonpriority queue, a default value in a range in which the command does not time out is set as the start time Ts.

First, the disk array controller 114 takes the job in the head of the priority queue as a job JOBp to be selected from the priority queue and takes the job in the head of the nonpriority queue as a job JOBnp to be selected from the nonpriority queue. Let Tp_s be the required start time of JOBp. Let Tnp_s be the required start time of JOBnp. Let Tc be the present time (step 901).

Then, the disk array controller 114 compares the present time Tc with the required start time Tp_s. The controller compares the present time Tc with the required start time Tnp_s (step 902). If both Tp_s and Tnp_s are later than the present time Tc, it follows that the jobs registered in the queues, respectively, have not reached the required start times. Therefore, the controller 114 compares the start times Tp_s and Tnp_s, and takes the job with the earlier time as a job to be executed in steps 905 and 907 (step 904).

Where the required start time of the job registered in at least one of the queues is earlier than the present time Tc, the disk array controller 114 checks to see if both Tp_s and Tnp_s have passed the present time Tc (step 903). If so, the controller 114 preferentially executes the job in the priority queue (step 906).

Where the required start time of the job registered in either queue is earlier than the present time Tc, the disk array controller 114 compares their required start times (step 904). The job having the earlier required start time is selected (steps 905 and 907). Consequently, this is equivalent to selecting the job having the required start time earlier than the present time Tc.

Either the priority job or the nonpriority job can be executed as long as before the required start time, and so, the job having the earlier required start time is selected by the processing described above. Where both required start times are later than the present time, the priority job is selected to minimize the delay in processing of the priority job.

The I/O scheduling illustrated in FIG. 7 can be used in plural locations within the disk array controller. For example, it can be applied to a ready queue where jobs in a waiting state are queued because they can be made executable and to a drive queue in which jobs are queued when a command is issued to the drive.

Still another embodiment of the present invention involves a disk array system comprising a transfer rate recognition portion, a second recognition portion for recognizing drive performance and a fault processing time, a buffer size determination portion, a drive I/O size determination portion, and an I/O scheduling portion. The buffer size determination portion and the drive I/O size determination portion determine the buffer size and the drive I/O size, using the transfer rate recognized by the transfer rate recognition portion and the drive performance and the fault processing time recognized by the second recognition portion. The I/O scheduling portion prioritizes I/O processes, using the recognized transfer rate, drive performance, fault processing time, determined buffer size, and drive I/O size. Thus, the disk array system assures the transfer rate.

What is claimed is:

1. A storage system comprising: a controller connectable to a plurality of computers; a plurality of storage devices connected to the controller; and a cache memory in which a plurality of buffers are set, the buffers corresponding one-to-one to streaming accesses and each buffer of the buffers temporarily storing data when processing the stream accesses, wherein the plurality of storage devices store a plurality of contents, wherein the controller, when receiving multiple streaming accesses which are a set of streaming accesses requested from the respective computers, performing a processing step for each streaming access of the multiple streaming accesses and, in response to a streaming access to the content from at least one of the computers, reading data related to the content in the storage device and storing the data in a relevant buffer, and delivering the stored data to the computer which is a requestor of the streaming access;

wherein, the controller:

makes a decision, for each access of a plurality of accesses requested by the plurality of computers to the controller, as to whether the access is a streaming access, sets a maximum transfer rate for said each access of the accesses judged as a streaming access, executes, with the computer which is the requestor of the streaming access, an I/O operation related to the streaming access at the maximum transfer rate, measures an amount of data transferred to and from the computer, calculates a transfer rate related to the streaming access based on the measured amount of data, and takes the transfer rate as a transfer rate of the streaming access, determines a size of a relevant buffer so that processing of the streaming access is performed assuring the calculated transfer rate and assigns the size to the cache memory, finds, based on the relevant buffer size and the transfer rate, a required compilation time of a lob which is related to the streaming access and performed for the storage apparatus, calculates a time taken to process the job and, if it is found impossible to perform the job within the required compilation time, increases the size of the relevant buffer, determines, based on the relevant buffer size, an amount of data accessible in one operation set by a command issued to the storage apparatus and, if multiple streams required to be sent at high transfer rates are received, increases the determined amount of data, and calculates, for each job of a plurality of jobs related to the streaming accesses, the time taken to process the lob and the required compilation time and calculates, based on the calculated time, a required start time.

2. A storage control system comprising: a controller connected to a storage apparatus storing a content and a plurality of computers and, when receiving multiple streaming accesses which are a set of streaming accesses requested from the respective computers, performing a processing step for each streaming access of the multiple streaming accesses and, in response to a streaming access to the content from at least one of the computers, reading data related to the content in the storage apparatus and storing the data in a relevant buffer, and delivering the stored data to the computer which is a requestor of the streaming access; and a cache memory in which a plurality of buffers are set, the buffers corresponding one-to-one to the streaming accesses and each buffer of the buffers temporarily storing data when processing the stream accesses, wherein, the controller:

makes a decision, for each access of a plurality of accesses requested by the plurality of computers to the controller, as to whether the access is a streaming access, sets a maximum transfer rate for said each access of the accesses judged as a streaming access, executes, with the computer which is the requestor of the streaming access, an I/O operation related to the streaming access at the maximum transfer rate, measures an amount of data transferred to and from the computer, calculates a transfer rate related to the streaming access based on the measured amount of data, and takes the transfer rate as a transfer rate of the streaming access, determines a size of a relevant buffer so that processing of the streaming access is performed assuring the calculated transfer rate and assigns the size to the cache memory, finds, based on the relevant buffer size and the transfer rate, a required compilation time of a job which is related to the streaming access and performed for the storage apparatus, calculates a time taken to process the job and, if it is found impossible to perform the job within the required compilation time, increases the size of the relevant buffer, determines, based on the relevant buffer size, an amount of data accessible in one operation set by a command issued to the storage apparatus and, if multiple streams required to be sent at high transfer rates are received, increases the determined amount of data, calculates, for each job of a plurality of jobs related to the streaming accesses, the time taken to process the job and the required compilation time and calculates, based on the calculated time, a required start time, and regardless of an order in which the jobs are created, sets an order in which the jobs are executed based on an order of the required start times, and the cache memory includes a queue area for storing one or more queues of the jobs, the queue area includes a first queue area and a second queue area, and the controller registers one or more priority queues in the first queue area and other queues in the second queue area, and a higher priority is given to processing of a job registered in the first queue area than to processing of a job registered in the second queue area.

3. The storage control system according to claim 2, wherein the controller determines whether or not the access is a streaming access based on whether or not the access is a sequential access.

4. The storage control system according to claim 2, wherein, when an access is made to a certain logical unit storing the content in the storage apparatus, the controller determines that the access as a streaming access.

5. The storage control system according to claim 2, wherein the storage apparatus stores a plurality of types of the content, stores the calculated transfer rate, and, when receiving an access to the same content which is a target of the streaming access, executes data transfer using the stored transfer rate.

6. The storage control system according to claim 2, wherein
the job is prefetch of the content by the controller in response to the streaming access to the storage apparatus, and
the controller calculates a time taken by the prefetch based on at least one of performance of a storage drive constituting the storage apparatus, time taken to perform fault processing for the storage drive, and an allowable number of commands that can be processed by the storage drive.

7. The storage control system according to claim 6, wherein, when the controller determines that a number of commands being processed by the storage drive has reached the allowable number, it suppresses issuance of an I/O to the storage drive.

8. The storage control system according to claim 2, wherein the controller:
selects a first job from the first queue area;
selects a second job from the second queue area;
calculates the required start time for the first job and the second job respectively, sets the required start time for the first job as a first required start time and the required start time for the second job as a second required start time;

if the first required start time and the second required start time are later than a present time, executes the job with earlier required start time immediately, if at least one of the first required start time and the second required start time is earlier than the present time, executes the job with the earlier required start time immediately, and if the first required start time and the second required start time are earlier than the present time, executes the first job immediately.

9. A method for use in a storage control system including:

a controller connected to a storage apparatus storing a content and a plurality of computers and, when receiving multiple streaming accesses which are a set of streaming accesses requested from the respective computers, performing a processing step for each streaming access of the multiple streaming accesses and, in response to a streaming access to the content from at least one of the computers, reading data related to the content in the storage apparatus and storing the data in a relevant buffer, and delivering the stored data to the computer which is a requestor of the streaming access; and a cache memory in which a plurality of buffers are set, the buffers corresponding one-to-one to the streaming accesses and each buffer of the buffers temporarily storing data when processing the stream accesses, wherein the method is carried out by a processor and effects operations comprising:

making a decision, for each access of a plurality of accesses requested by the plurality of computers to the controller, as to whether the access is a streaming access, setting a maximum transfer rate for said each access of the accesses judged as a streaming access, executing, with the computer which is the requestor of the streaming access, an I/O operation related to the streaming access at the maximum transfer rate, measuring an amount of data transferred to and from the computer, calculating a transfer rate related to the streaming access based on the measured amount of data, and taking the transfer rate as a transfer rate of the streaming access, determining a size of a relevant buffer so that processing of the streaming access assuring the calculated transfer rate and assigning the size to the cache memory, finding, based on the relevant buffer size and the transfer rate, a required compilation time of a job which is related to the streaming access and performed for the storage apparatus, calculating a time taken to process the job and, if it is found impossible to perform the job within the required compilation time, increasing the size of the relevant buffer determining, based on the relevant buffer size, an amount of data accessible in one operation set by a command issued to the storage apparatus and, if multiple streams required to be sent at high transfer rates are received, increasing the determined amount of data, calculating, for each job of a plurality of jobs related to the streaming accesses, the time taken to process the job and the required compilation time and calculating, based on the calculated time, a required start time, and regardless of an order in which the jobs are created, setting an order in which the jobs are executed based on an order of the required start times, and including in the cache memory, a queue area for storing one or more queues of the jobs, the queue area including a first queue area and a second queue area, and the controller registering one or more priority queues in the first queue area and other queues in the second queue area, and giving a higher priority to processing of a job registered in the first queue area than to processing of a job registered in the second queue area.

10. The method according to claim 9, wherein the controller determining whether or not the access is a streaming access based on whether or not the access is a sequential access.

11. The method according to claim 9, wherein, when an access is made to a certain logical unit storing the content in the storage apparatus, the controller determining that the access as a streaming access.

12. The method according to claim 9, wherein the storage apparatus stores a plurality of types of the content, stores the calculated transfer rate, and, when receiving an access to the same content which is a target of the streaming access, executing data transfer using the stored transfer rate.

13. The method according to claim 9, wherein the job is prefetch of the content by the controller in response to the streaming access to the storage apparatus, and the controller calculating a time taken by the prefetch based on at least one of performance of a storage drive constituting the storage apparatus, time taken to perform fault processing for the storage drive, and an allowable number of commands that can be processed by the storage drive.

14. The method according to claim 13, wherein, when the controller determining that a number of commands being processed by the storage drive has reached the allowable number, it suppresses issuance of an I/O to the storage drive.

15. The method according to claim 9, wherein the controller:

selecting a first job from the first queue area;

selecting a second job from the second queue area;

calculating the required start time for the first job and the second job respectively, setting the required start time for the first job as a first required start time and the required start time for the second job as a second required start time;

if the first required start time and the second required start time are later than a present time, executing the job with earlier required start time immediately, if at least one of the first required start time and the second required start time is earlier than the present time, executing the job with the earlier required start time immediately, and if the first required start time and the second required start time are earlier than the present time, executing the first job immediately.

* * * * *